Oct. 28, 1930.                 H. SILVER                  1,779,644
              EMERGENCY PROPELLER FOR AIRCRAFT
                    Filed Aug. 21, 1929
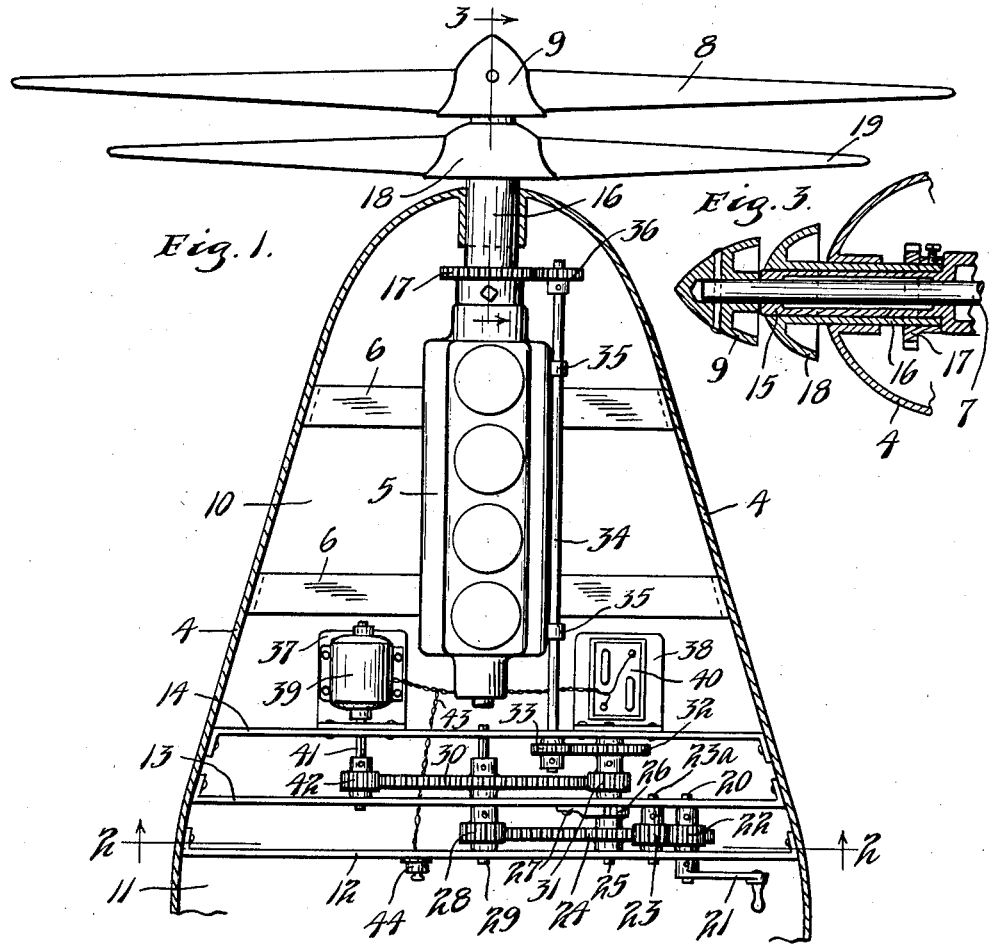
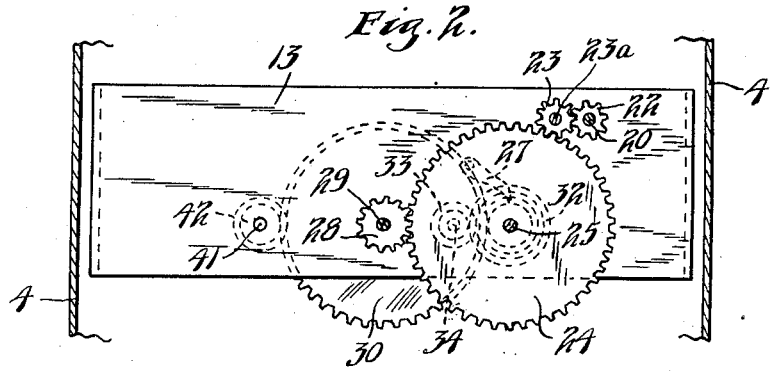
INVENTOR.
HERMAN SILVER.
BY HIS ATTORNEYS.

Patented Oct. 28, 1930

1,779,644

UNITED STATES PATENT OFFICE

HERMAN SILVER, OF MINNEAPOLIS, MINNESOTA

EMERGENCY PROPELLER FOR AIR CRAFT

Application filed August 21, 1929. Serial No. 387,360.

This invention relates to safety devices for air craft.

It is the object of this invention to provide a novel auxiliary propeller for air craft which can be operated either by hand or by other power not associated with the engine, or both, to permit the air craft to be given a short flying range, in case the engine should stall in the air and thus allow the air craft to be safely landed.

To this end, the invention consists in the novel parts and novel combinations of parts, hereinafter defined in the claims and described in the following specification, made in connection with the accompanying drawings, wherein like reference characters refer to the same or similar parts throughout the various views, and, in which, Fig. 1 is a horizontal section taken through the forward end of the fuselage of an airplane equipped with an embodiment of the present invention;

Fig. 2 is a vertical section taken on the line 2—2 of Fig. 1, as indicated by the arrows, and Fig. 3 is a vertical section taken on the line 3—3 of Fig. 1 as indicated by the arrows.

Referring to the drawings, portions of an airplane are illustrated including the fuselage 4, engine 5 mounted on cross bar 6 extending between the two sides of the forward end of the fuselage, the propeller shaft 7 driven from the engine 5 and projecting through a sleeve at the forward end or nose of the fuselage and the main propeller 8 having its hub 9 secured to the forward end of the propeller shaft 7. The engine pit 10 of the airplane is divided from the driving pit 11 by means of the instrument panel 12 and also by means of two transverse panels 13 and 14 forwardly spaced from the instrument panel 12 and from each other. In accordance with the present invention, a tube-like bearing 15 is fixed to the forward end of the engine 5 and the propeller shaft 7 projects through this bearing and is journaled adjacent the hub 9 of the main propeller 8 in the bearing 15. A sleeve 16 carrying a gear 17 adjacent its rear end fits over the tubular bearing 15 and is journaled thereon and the hub 18 for an auxiliary propeller 19 is fixed to or formed integral with the sleeve 16 for rotation therewith. The propeller 19 is inwardly disposed toward the engine 5 relative to the main propeller 8, the hub 18 being disposed slightly outwardly from the nose of the fuselage 4. It will be noted that the propeller 19 can be rotated independently of the main propeller 8 and the propeller shaft 7 while, of course, the propeller shaft and main propeller may be driven as usual from the engine 5 without interference by the auxiliary propeller 19.

Although the auxiliary propeller 19 may be driven from any suitable source of power not associated with the engine 5, in the drawings, I have shown a hand operated driving mechanism and a motor operated driving mechanism which can be used either independently or in conjunction with each other to drive the auxiliary propeller 19 when desired. A shaft 20 is illustrated as being journaled in the instrument panel 12 and in the panel 13, and this shaft, at its rear end, carries a hand crank 21 mounted for turning movement adjacent the right hand side of the instrument panel 12. A pinion 22 carried by shaft 20 between the panels 12 and 13 meshes with a reversing gear 23 mounted on a short shaft 23ª also journaled in the panels 12 and 13. The reversing gear 23 meshes with a large gear 24 loosely journaled on a shaft 25 which, in turn, extends between the panels 12 and 14 and is journaled in the said panels and also in the panel 13. The gear 24 has secured thereto a ratchet 26 with which a gravity or spring pressed pawl 27, pivoted to panel 13, is adapted to engage, to permit movement of the gear 24 and associated parts only in one direction. The gear 24 meshes with a small gear 28 fixed to a shaft 29 journaled in and extending between the three panels 12, 13 and 14 at the central portions thereof. The gear 28 is disposed between the two panels 12 and 13, while disposed between the two panels 13 and 14 and fixed to the shaft 29, is a large gear 30 meshing with a smaller gear 31 fixed to the shaft 25 between the panels 13 and 14, and also disposed between the two panels 13 and 14 is a pinion 32 in mesh with a small gear 33 fixed to a long shaft 34, which extends forwardly from the panel 14 to a point adjacent the gear 17 on the sleeve 16. The shaft 34 is illustrated as being journaled in bearings 35 mounted on the right side of the engine 5, but this shaft may be otherwise suitably bearinged if desired. The shaft 34 carries at its forward end a pinion 36 in mesh with the gear 17.

The panel 14 is illustrated as supporting at either side of the engine 5 two horizontal and forwardly projecting shelves 37 and 38. An electric motor 39 is mounted on the shelf 37, while a battery 40 for driving the motor 39 is supported on the shelf 38. The battery 40, if desired, may be the same battery that supplies the electric current for the engine 5. The motor shaft 41 for motor 39 projects rearwardly from the motor through the two panels 14 and 13 and is journaled therein and has fixed thereto a small pinion 42 in mesh with the large gear 30. Suitable electrical conductors 43 lead from the battery to the motor and to a switch 44 mounted on the instrument panel 12, the switch controlling the supply of electricity to the motor.

If, for any reason, the motor 5 turning the propeller shaft and main propeller 8, should stall when the airplane is in the air, the auxiliary propeller 19 can be set in operation to supply sufficient power to the plane to maintain the plane in the air long enough for the pilot to make a safe landing. The pilot of the plane will, of course, be sitting in the driving pit 11. As soon as he finds that his engine 5 is stalled, he will turn on the switch 44 to supply electricity from the battery 40 to the motor 39 and set the motor in operation. He will also immediately grasp the hand crank 21 and revolve the crank in a clockwise direction. As the crank 21 is revolved, the pinion 22 will cause the gear 23 to turn in a counter clockwise direction as viewed from the pilot seat, thereby causing the gear 24 to revolve in a clockwise direction and the gear 28 and gear 30 to revolve in a counter clockwise direction. The gear 30 will transmit power through the gear 31 to the pinion 32 to drive the pinion 32 in a clockwise direction and the pinion 32, in turn, will drive the gear 33 in a counter clockwise direction. The shaft 34 and pinion 36 will, accordingly, be driven in a counter clockwise direction, thereby causing the gear 17, sleeve 16 and auxiliary propeller 19 to be turned in a clockwise direction. The motor 39 will be so arranged that the shaft 41 turns in a clockwise direction when the motor is set in operation and, accordingly, the gear 42 on the shaft 41 will exert its power against the gear 30 to act in conjunction with the hand power of the pilot to turn the gear 30 in a counter clockwise direction. The power transmission mechanism between the crank 21 and motor 39 and the gear 17 on sleeve 16, will be such that when the crank 21 is rapidly revolved and the motor 39 is also set in operation, the auxiliary propeller 19 will be rotated with sufficient force and at such a speed as to sustain or, at least, partially sustain the plane in the air. Various propeller transmission mechanism will be provided for each individual plane to accomplish this purpose, the transmission mechanism shown being only illustrated to indicate a suitable type of transmission mechanism that can be used. It may be found that sufficient power can be imparted to the auxiliary propeller 19 by merely turning the crank 21 by hand to sustain the plane in the air long enough to make a proper forced landing, while similarly the motor 39 may be made strong enough to supply the requisite power to the auxiliary propeller 19 alone to permit the plane to be sustained in the air long enough to make a forced landing. It is preferred, however, to use the hand power in conjunction with the motor inasmuch as more power can be thereby generated to turn the auxiliary propeller and the size of the motor can be reduced.

It will of course, be understood that various changes may be made in the form, details, arrangement and proportions of the various parts without departing from the scope of the present invention.

What is claimed is:—

1. The combination with an air craft including an engine, a propeller shaft driven by the engine and a main propeller secured to said shaft, of an auxiliary propeller journaled at the forward end of the air craft behind said main propeller, transmission mechanism for driving said auxiliary propeller, a hand crank for turning said transmission mechanism, and an electric motor adapted to drive said transmission mechanism in unison with hand power applied to said crank.

2. The combination with an air craft including an engine, a propeller shaft driven by the engine and a main propeller secured to said shaft, of a sleeve journaled on said shaft, an auxiliary propeller secured to said sleeve at the forward end of the air craft behind said main propeller, transmission mechanism for driving said sleeve, a hand crank for turning said transmission mechanism, and an electric motor adapted to drive said transmission mechanism in unison with hand power applied to said crank.

In testimony whereof I affix my signature.

HERMAN SILVER.